UNITED STATES PATENT OFFICE.

JAMES H. SMITH AND JAMES H. DOUGLASS, OF PORT HURON, MICHIGAN.

IMPROVEMENT IN ARTIFICIAL MARBLES.

Specification forming part of Letters Patent No. 182,335, dated September 19, 1876; application filed August 16, 1876.

*To all whom it may concern:*

Be it known that we, JAMES H. SMITH and JAMES H. DOUGLASS, of Port Huron, in the county of St. Clair and State of Michigan, have invented certain new and useful Improvements in Artificial Marbles; and we do hereby declare that the following is a full, clear, and exact description thereof, which will enable others skilled in the art to which it appertains to make and use the same, reference being had to the accompanying drawings and to letters of reference marked thereon, which form a part of this specification.

Our invention relates to the manufacture of artificial marble; and the invention consists in a new combination of materials or ingredients, which we prepare and combine in manner as hereinafter more fully set forth.

The elements of the combination or ingredients which we use are as follows: White gum-shellac, fish-glue, isinglass, asbestus, gum-arabic, plaster-of-paris, Keene's cement, (a well-known article of commerce,) and various mineral colors, with water sufficient to make the mixture plastic.

The method of preparation or process of manufacture is as follows: We take of Keene's cement five parts, and add to it one part of plaster-of-paris, mixing and moistening these ingredients to the consistency of paste with a solution composed of equal parts or quantities of gum-arabic, fish-glue, isinglass, pulverized or disintegrated asbestus, and white gum-shellac dissolved in soda-water. After the whole compound is mixed together we divide the mass into portions convenient for handling, and to each portion we add sufficient wet mineral coloring-matter to give it the desired shades, the colors varying according to the kind of marble it is desired to imitate.

The masses of material thus prepared with different shades or colors are then thrown alternately into molds until a sufficient depth or thickness is obtained on the face of the mold. The balance of the space in the mold is then filled up with Keene's cement, fine or coarse, as found most convenient, said cement being mixed and combined with plaster-of-paris in the same proportion, and moistened to the consistency of mortar with the same solution as before specified. This part of the process may be best accomplished with the ordinary trowel.

The process of finishing and polishing our improved artificial marble does not differ in any material respect from that usually followed. A fine surface is formed by rubbing with pumice or other suitable stone, all imperfections in the casting being removed or filled up with the same material, after which it is polished by any of the well-known methods in use for polishing marble, or it may be finished by "varnishing," a well-known process specially adapted for finishing artificial marble.

This artificial marble may be used as a facing in combination with a backing of wood, slate, or other material; or the article to be produced may be entirely made of the artificial marble, as herein described.

It will also be obvious that a great variety of useful articles may be made of this compound material, which will have the appearance of natural marble, the cost of production being trifling compared with the cost of the natural marble.

Having thus described our invention, what we claim as new, and desire to secure by Letters Patent, is—

An artificial marble made of Keene's cement, plaster-of-paris, fish-glue, isinglass, gum-shellac, asbestus, gum-arabic, and wet mineral colors, prepared and molded in the manner substantially as and for the purpose specified.

In testimony that we claim the foregoing as our own we affix our signatures in presence of two witnesses.

JAMES H. SMITH.
    JAMES H. DOUGLASS.

Witnesses:
 CHARLES R. BROWN,
 B. O. FANRAND.